United States Patent [19]

Krausse

[11] Patent Number: 5,066,096

[45] Date of Patent: Nov. 19, 1991

[54] LIGHT WAVEGUIDE PLUG-TYPE CONNECTOR

[75] Inventor: Peter Krausse, Aschheim, Fed. Rep. of Germany

[73] Assignee: Siemens Aktiengesellschaft, Munich, Fed. Rep. of Germany

[21] Appl. No.: 654,520

[22] Filed: Feb. 13, 1991

[30] Foreign Application Priority Data

Feb. 16, 1990 [DE] Fed. Rep. of Germany ...................... 90001866[U]

[51] Int. Cl.[5] ................................................ G02B 6/38

[52] U.S. Cl. ...................................................... 385/58

[58] Field of Search ................ 350/96.20, 96.21, 96.22

[56] References Cited

U.S. PATENT DOCUMENTS

| | | | |
|---|---|---|---|
| 3,982,815 | 9/1976 | Nakayama | 350/96.22 |
| 4,009,931 | 3/1977 | Malsby | 350/96.22 |
| 4,140,365 | 2/1979 | Burger et al. | 350/96.20 |
| 4,687,291 | 8/1987 | Stape et al. | 350/96.21 |
| 4,900,125 | 2/1990 | Iyer | 350/96.21 |

*Primary Examiner*—William L. Sikes

*Assistant Examiner*—Robert E. Wise

*Attorney, Agent, or Firm*—Hill, Van Santen, Steadman & Simpson

[57] ABSTRACT

A light waveguide plug-type connector for rack mountings has one plug axially rigidly connected to one of the strips forming the rack mounting and the other plug being mounted for axial movement and the other of the two strips forming the rack mounting. A centering sleeve is carried in a tube which is mounted in the one strip and the plug is secured to this tube. Preferably, the centering sleeve is a slotted ceramic sleeve.

8 Claims, 3 Drawing Sheets

60
41
38
52
39a
40
39
35
2
4
43
42
39
51
49
19
50
48
2
36
47
35
37
45
46

LIGHT WAVEGUIDE PLUG-TYPE CONNECTOR

BACKGROUND OF THE INVENTION

The present invention is directed to light waveguide plug-type connector for a rack mounting, wherein an axially stationary plug is situated in a receptacle of a hybrid equipment or mixed equipment plug connector strip and an axially movable plug is situated in the cooperating strip and both plugs are centered relative to one another by a centering sleeve to enable forming an end-to-end contact therebetween.

German Gebrauchsmuster No. 89 01 052 shows a plug-type connector arrangement having a pair of cooperating strips with a stationarily fixed plug mounted on one strip and an axially movable plug connector being mounted in a second strip and the arrangement includes a centering sleeve or bushing for the purpose of forming an end-to-end contact of the two plugs.

SUMMARY OF THE INVENTION

The object of the present invention is to provide an improvement with regard to the assembly and universal employment of a plug-type connector for light waveguides.

This innovative achievement is achieved in an improvement in a light waveguide plug-type connector having a first plug, a second plug and a centering sleeve, wherein the centering sleeve is situated in a receptacle tube which, in turn, is secured with a threaded sleeve on one strip of a pair of hybrid equipment plug connector strips, a stationary plug is mounted on the one strip and extends into the centering sleeve, wherein the second plug is mounted in the other of the strips of the hybrid equipment plug connector strip by mounting means which enables axial movement and includes an axial spring.

Other advantages and features of the invention will be readily apparent from the following description of the preferred embodiments, the drawings and claims.

DESCRIPTION OF THE PREFERRED EMBODIMENTS

Figure 1:
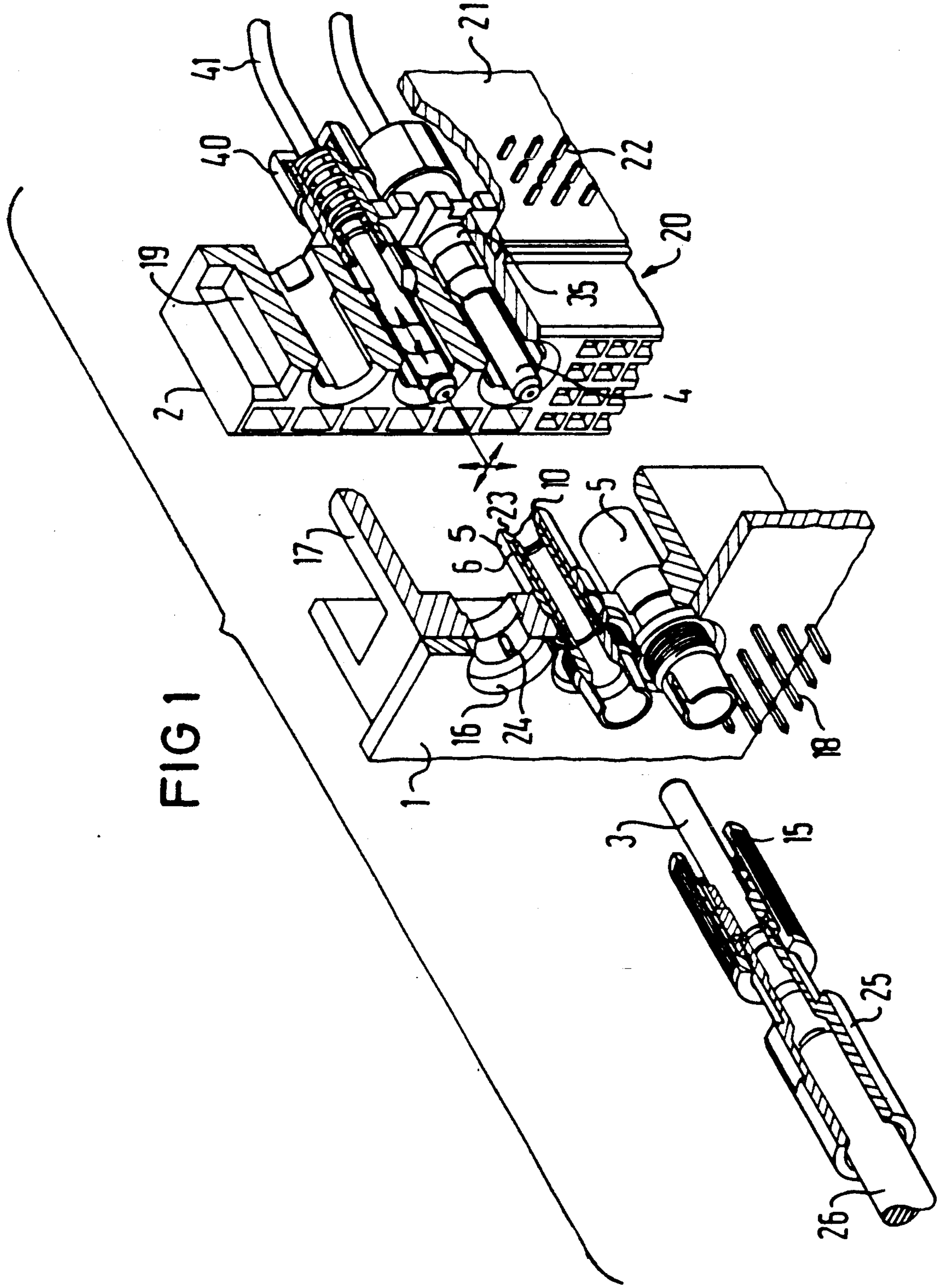
FIG. 1 is an exploded perspective view of an entire plug-type connector in accordance with the present invention with portions broken away for purposes of illustration.

As illustrated in the left-hand side of FIG. 1, a light waveguide plug 3, which is standardized according to DIN 47256, is to be axially rigidly fastened in what is referred to as a mixed strip or a hybrid strip 1 according to DIN 41612 or a hybrid equipment strip 1 known under the trademark SIEDECON. The mixed equipment or hybrid equipment strip 1 has standard passages 16 into which coaxial or high-tension contacts can be introduced with a given standard equipping. The strip 1 normally forms a part of what is referred to as an insert or also forms the receptacle of a rack side. Standard wrap pins 18 extend from a front surface of the strip 1 and are fashioned as pins on which wire can be wrapped to form a connection. These strips 1, which are known per se, have coding pins 17 extending in the direction opposite the front face, which pins are for the purpose of preventing mix-ups. In this example, the coding pin 17 engages into a corresponding recess or socket 19 in a cooperating second strip 2 that, in turn, forms a part of an insert, generally indicated at 20. The insert 20 is essentially composed of a printed circuit board 21, which is equipped with component parts, and the board 21 also has wrap or solder pins 22.

Figures 2A, 2B:
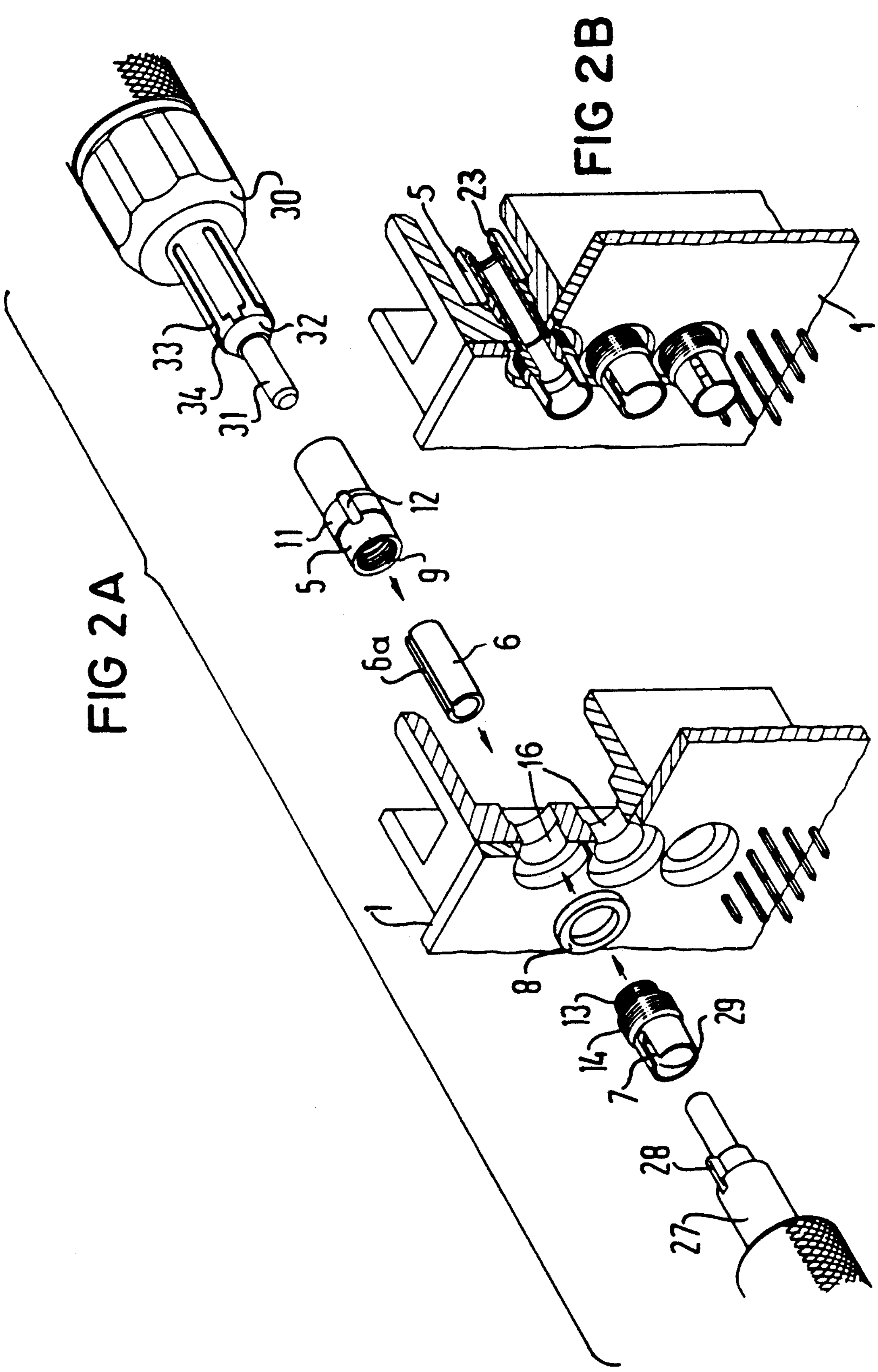
FIG. 2A is an exploded perspective view with portions removed for purposes of illustration of the equipment for mounting the centering sleeve in one of the hybrid equipment strips.
FIG. 2B is a perspective view with portions broken away for purposes of illustration of the centering sleeves mounted in the hybrid equipment strip.

For mounting a centering sleeve 6, which will center two light waveguide plugs including the first plug 3 and a second plug 4, in a passage 16 of the strip 1, a mount comprising a receptacle tube 5 is provided. The sleeve 6 is composed of a hard metal or a ceramic material and is preferably provided with a longitudinal slot 6*a* (see FIG. 2A). The mount formed by the receptacle tube 5 has a conical bezel 23 (FIG. 1) at one end which forms a part of an inwardly projecting collar or an internal shoulder 10 for engaging one end of the sleeve, which is the end that faces the other strip 2 of the pair of strips. As best illustrated in FIG. 2A, the tube 5 has an outer annular collar 11 which is provided with a plurality of longitudinal grooves 12. These grooves 12 are provided to correspond with projections or ribs 24 in the passage 16 of the strip 1. Thus, when the tube 5 is mounted in the passage 16, the ribs 24 received in the grooves 12 provide means to prevent twisting of the sleeve and tube in the strip. The tube 5, opposite the end with the bezel 23, is provided with internal threads 9 (FIG. 2A) which cooperates with threads 13 provided on a threaded sleeve 7. This threaded sleeve 7 performs two functions. First of all, when the sleeve 7 is threaded into the end of the tube 5, it acts to hold the centering sleeve 6 within the tube 5. Secondly, the sleeve 7 acting through a ring 8 coacts to mount the tube 5 with the sleeve 6 in the aperture or passage 16. The sleeve 7 has an outer, annular raised portion with outer threads 14 when compared to the threads 13 and these outer threads 14 (FIG. 2A) cooperate with internal threads 15 (FIG. 1) of a union nut of the plug pin 3. As illustrated in FIG. 1, the plug pin 3 is secured axially rigid in a mount 25 for a light waveguide 26.

To insert the holder for the centering sleeve 6, which holder is formed by the bushing or receptacle tube 5, auxiliary or assembly tools 27 and 30, which are illustrated in FIG. 2A, are used. One of the tools 27 has a projecting nose or end having a rib 28 which is received in a notch 29 formed in the sleeve 7. In order to hold the tube 5 while threading the sleeve 7 into the end having the threads 9, the auxiliary tool 30 can be provided. This tool 30 has a longitudinally extending pin 3 which will be received in the center of the sleeve 6. The tool also has tongues 33 on an enlarged shoulder 32 of the pin 31. These tongues have nose-shaped ends 34 which will be engaged in corresponding grooves formed in the bezel 23. The securing of the bushing or tube 5 in the strip 1 can be accomplished, in any instance, with these two tools. It is noted that the tube 5 is preferably provided with the notch or groove 12 that cooperate with the projection 24 to form an anti-twist mechanism. However, during insertion, this anti-twist mechanism may not be completely established or, in some instances, the particular strip may not have the projections to cooperate with the above-mentioned grooves.

Figures 3A, 3B:
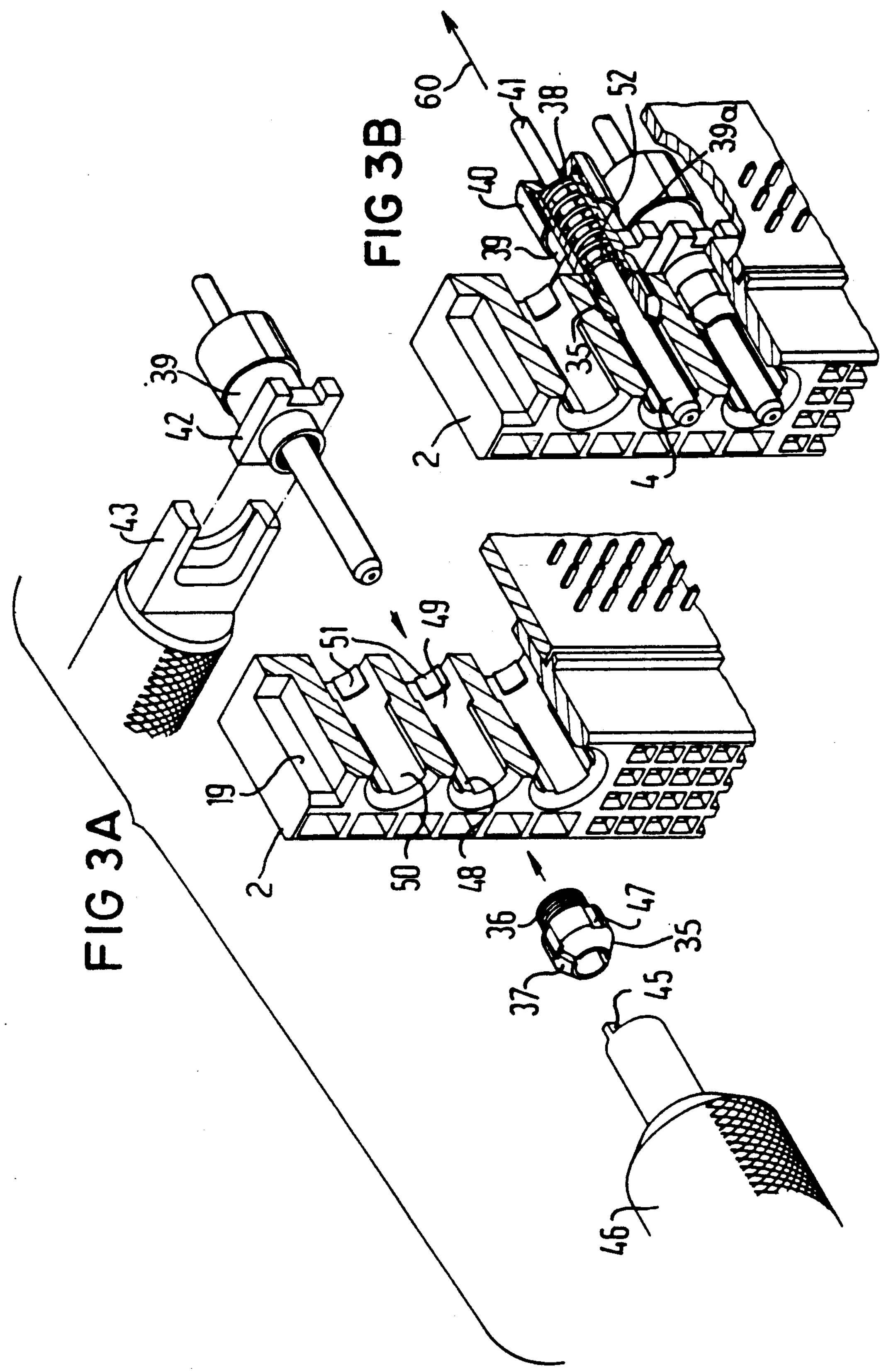
FIG. 3A is an exploded perspective view with portions removed for purposes of illustration of the equipment for mounting the axially movable plug in the other strip of the hybrid equipment strips.
FIG. 3B is a perspective view with portions removed illustrating the mounted axially movable plugs in the equipment strip.

To secure the plug 4 in the strip 2, the tool arrangement illustrated in FIG. 3A may be utilized. The pin 4 is mounted in the strip 2 by a mounting arrangement which includes a tubular member or mounting sleeve 39, a cap or union nut 40 and a threaded bushing or nut 35. The threaded nut 35 has one end 36 provided with external threads which cooperate with internal threads 39*a* provided at one end of the tube or bushing 39. The other end of the bushing 39 is provided with external threads which receive the union nut 40, which has an opening to receive the light waveguide 41. The pin 4 has a groove receiving a retainer ring 52 (FIG. 3B) which is engaged by one end of a spring 38 which is telescopically received over the pin and the waveguide and held by the union nut 40. Thus, as illustrated, the pin 4 can be axially shifted from a position illustrated in FIG. 3B in the direction of an arrow 60 against the force of the spring 38. Also, it should be noted that the movement of the pin 4 by the spring 38 will be limited by the retainer 52 being urged against an end of the plug or nut 35.

To assemble the nut 35 into the end of the tube or sleeve 39, the sleeve 39, as illustrated in FIG. 3A, is provided with a shoulder forming a square nut 42. Which also forms together with the strip 2 an anti-twist mechanism. This can be engaged by a wrench 43 to prevent rotation or twisting of the pin and tube 39. The bushing or nut 35, on one end, is provided with grooves or slots which are engaged by a blade member 45 of an auxiliary tool 46. This tool 46 has an axially extending bore for receiving the pin 4 as the nut 35 is being threaded into the end of the tube 39.

The nut 35, as illustrated, is provided with a chamfered or bevelled portion 37 that coacts with the bezel 23 of the tube 5 when the two strips 1 and 2 are assembled. Thus, the pin 4 can be centered in a floating fashion within the bezel 23 during a plugging-in operation. In addition, as illustrated, the nut 35 is provided with longitudinal grooves 47 which coact with longitudinally extending ribs or noses 48 provided in the passage of some types of strips. Thus, during a certain step of inserting the nut 35 into the passage, it will not be rotatable. However, at a region or section 49, the passage 50 is free of the ribs or noses 48 so that the nut can be twisted during the assembly step. The passage 50 is also provided with projections 51 on the other side of the free-turning region 49, which form shoulders to prevent the passage of the nut 35 and can cooperate with grooves (not illustrated) provided on the end of the tube 39.

The plug connection being formed between the two strips is particularly useful for what is known as single μ-mode fibers.

Although various minor modifications may be suggested by those versed in the art, it should be understood that I wish to embody within the scope of the patent granted hereon all such modifications as reasonably and properly come within the scope of my contribution to the art.

I claim:

1. A light waveguide plug-type connector for a rack mounting having two hybrid equipment strips, said connector comprising a first plug, a second plug and a centering sleeve, said centering sleeve being received in a receptacle tube, said tube being mounted in one of the two strips by a threaded sleeve being threadably received into one end of the tube, said first plug being fixably mounted on said one strip and extending into said centering sleeve and means for mounting the second plug on the other strip of the two strips for axial movement, said means for mounting including a spring so that when the two strips are brought together, the second plug extends into the centering sleeve to be centered relative to the first plug and can yield as ends of the two plugs engage each other.

2. A light waveguide plug-type connector according to claim 1, wherein the centering sleeve is composed of a longitudinally slotted small tube of a ceramic material, said receptacle tube, at an end opposite a threaded end, being provided with an inwardly extending shoulder for engaging an end of the centering sleeve as the opposite end is engaged by the threaded sleeve.

3. A light waveguide plug-type connector according to claim 2, wherein the means for mounting the second plug includes a housing surrounding a portion of the second plug and receiving said spring, said spring acting on a retainer provided on said second plug and having the other end acting on a union nut threaded onto a tubular member forming said housing.

4. A light waveguide plug-type connector according to claim 3, wherein the second plug is received in a threaded bushing with play, said bushing having a conical bezel for engaging a bezel of said receptacle tube, said second plug being provided with a helical groove.

5. A light waveguide plug-type connector according to claim 4, wherein the other hybrid strip is secured onto a printed circuit board.

6. A light waveguide plug-type connector for a rack mounting having two hybrid equipment plug connector strips, said connector comprising a first plug, a second plug, a centering sleeve, said centering sleeve being received in a receptacle tube having an internal shoulder at one end and internal threads at the opposite end, said tube being mounted in one of the two strips by a threaded sleeve being threadably received on said opposite end of the tube, said first plug being fixably mounted on said one strip to extend into said centering sleeve by being threadably received on external threads of said threaded sleeve, means for mounting the second plug on the other strip of the two strips, said means for mounting the second plug including a mounting sleeve telescopically receiving the second plug, a nut threadably received in said sleeve and surrounding a portion of said plug, a spring telescopically received on the plug received in said mounting sleeve and means for holding the spring within said mounting sleeve so that the second plug is axially yieldable in said other strip.

7. A light waveguide plug connector according to claim 6, wherein the centering sleeve is a slotted tube.

8. A light waveguide plug connector according to claim 6, wherein the second plug is mounted in a bore of the other strip by a nut engaging internal shoulders provided in the bore of the other strip and the mounting sleeve has an external shoulder engaging a back side of said strip.

* * * * *